US012755226B2

(12) United States Patent
Sikander et al.

(10) Patent No.: US 12,755,226 B2
(45) Date of Patent: Oct. 6, 2026

(54) COMPUTER-AUTOMATED SLOTTING SYSTEM AND METHOD

(71) Applicant: Synkrato Inc., San Ramon, CA (US)

(72) Inventors: Amin Sikander, San Ramon, CA (US); Karun Jain, San Mateo, CA (US); Sury Balasubramanian, Sunnyvale, CA (US); Jason Mancuso, Cape May, NJ (US); Alejandro Derbez Gomez, Querétaro (MX); Sandeep Konam, Hyderabad (IN); Anantha Karthik, Chennai (IN); Jayanth Krishna Mogali, Redmond, WA (US)

(73) Assignee: Synkrato Inc., San Ramon, CA (US)

( * ) Notice: Subject to any disclaimer, the term of this patent is extended or adjusted under 35 U.S.C. 154(b) by 15 days.

(21) Appl. No.: 18/796,583

(22) Filed: Aug. 7, 2024

(65) Prior Publication Data

US 2025/0061396 A1 Feb. 20, 2025

(30) Foreign Application Priority Data

Aug. 16, 2023 (IN) ............................ 202321054882

(51) Int. Cl.
*G06Q 10/0631* (2023.01)
*G06Q 10/067* (2023.01)

(52) U.S. Cl.
CPC ..... *G06Q 10/06315* (2013.01); *G06Q 10/067* (2013.01)

(58) Field of Classification Search
None
See application file for complete search history.

(56) References Cited

U.S. PATENT DOCUMENTS 6,744,436 B1 6/2004 Chirieleison, Jr.
10,540,682 B1 * 1/2020 Weidman ........... G06Q 30/0246
(Continued)

FOREIGN PATENT DOCUMENTS

CN 107862932 A1 3/2018
CN 112875112 B 8/2021
(Continued)

OTHER PUBLICATIONS

Mendes, Alberto Miguel Araújo Duarte. Slotting Strategy in a Pharmaceutical Wholesaler Warehouse. MS thesis. Universidade do Porto (Portugal), 2021. (Year: 2021).*
(Continued)

*Primary Examiner* — Sara Grace Brown
(74) *Attorney, Agent, or Firm* — Blueshift IP; Robert Plotkin

(57) ABSTRACT

A computer-automated system performs slotting optimization based on inputs such as any one or more of the following: sales history, Advanced Shipment Notices (ASNs), picking history, current inventory, pick history, demand forecast, location placement, and multiple warehouse configuration parameters (e.g., slotting rules configurable by the user). Based on those inputs, the system detects product affinities, builds a predictive order book, and accounts for re-slotting costs and runs through multiple simulations to generate a slotting plan. The system receives feedback on its outputs and learns based on that feedback, thereby continuously improving the slotting recommendations that it generates.

18 Claims, 2 Drawing Sheets

(56) References Cited

U.S. PATENT DOCUMENTS

| | | | | |
|---|---|---|---|---|
| 2009/0030667 | A1 | 1/2009 | Toloo | |
| 2018/0253680 | A1* | 9/2018 | Jahani | G06Q 30/0633 |
| 2019/0026691 | A1* | 1/2019 | Chen | G06Q 10/08355 |
| 2019/0385219 | A1 | 12/2019 | Ouyang | |
| 2020/0039747 | A1 | 2/2020 | Ahmann | |
| 2021/0294930 | A1* | 9/2021 | Cai | G06N 3/0464 |
| 2022/0198565 | A1* | 6/2022 | Krishnaswamy | G06Q 10/06313 |
| 2023/0029445 | A9 | 1/2023 | Adra | |
| 2023/0045486 | A1* | 2/2023 | Autry | H04L 63/0428 |
| 2023/0127651 | A1 | 4/2023 | Cella | |
| 2023/0128899 | A1* | 4/2023 | Schneider | G06Q 10/04 700/106 |
| 2023/0267400 | A1* | 8/2023 | Nicotera | G06N 3/09 705/7.25 |
| 2024/0046204 | A1* | 2/2024 | Haley | G06N 3/098 |

FOREIGN PATENT DOCUMENTS

| | | | |
|---|---|---|---|
| JP | 2023500378 | A | 1/2023 |
| KR | 20210087917 | A | 7/2021 |
| KR | 2023023855 | A | 2/2023 |
| WO | 2023049197 | A1 | 3/2023 |

OTHER PUBLICATIONS

Liu, Jingwei. Order Picking Method for Multi-entity Cooperation in Picking Warehouses. Diss. Auburn University, Aug. 5, 2023. (Year: 2023).*

International Search Report and Written Opinion issued in App. No. PCT/US2024/041190, dated Nov. 19, 2024, 15 pages.

Create a Soft, Total Warehoue Visibility, Digital Twin Studio. 13 pages.

De Koster, René, Tho Le-Duc, and Kees Jan Roodbergen. "Design and control of warehouse order picking: A literature review." European journal of operational research 182.2 (2007): 481-501.

Digital Twins: The Future of Warehouse Operations? GlobeCon Freight, 2023, 2 pages.

Distribution Center Management, Optricity Balancing the DCs goals and constraints helps optimize slotting, Jan. 2010, 2 pages.

GQ Research, Global Artificial Intelligence in Warehouse Logistics Market, 2023, 107 pages.

Hu, Yuzhen, et al. "Slotting optimization of warehousing system based on the hungarian method." Proceedings of the Tenth International Conference on Management Science and Engineering Management. Springer Singapore, 2017. 18 pages.

Jahani, Parvaneh. "Dynamic warehouse optimization using predictive analytics." (2016). 205 pages.

Karásek, Jan. "An overview of warehouse optimization." International journal of advances in telecommunications, electrotechnics, signals and systems 2.3 (2013): 111-117.

NoCode Enterprise Metaverse App Builder, CloudWorx Studio, Software Development. Linkedin. 2019, 15 pages.

Optricity Rethinking Your Reslotting Strategy, Optricity Corp., 2012, 16 pages.

Optricity Thought Leadership-Slotting in the Dynamic Distribution Center, Supply & Demand Chain Executive, Apr./May 2008, 2 pages.

Optricity Warehouse Slotting-Increase Performance in Your Slotting Universe, Optricity, (2012), 16 pages.

Sanei, O., et al. "A heuristic algorithm for the warehouse space assignment problem considering operational constraints: with application in a case study." 2011 International Conference on Industrial Engineering and Operations Management, Kuala Lumpur, Malaysia. 2011. 7 pages.

Supply & Demand Chain Executive, Optricity Profiling vs Slotting proof SDCE Aug Sep. 2010. 1 page.

Warehouse Digital Twins, Virtual World Simulations Live-Linked to the Physical World. 2 pages.

Wascher, Order Picking; A Survey of Planning Proiblems and Methods, Faculty of Economics and Management Magdeburg (2002), 34 pages.

Zunic, Emir, et al. "Design of optimization system for warehouse order picking in real environment." 2017 XXVI International Conference on Information, Communication and Automation Technologies (ICAT). IEEE, 2017.

* cited by examiner

COMPUTER-AUTOMATED SLOTTING SYSTEM AND METHOD

BACKGROUND

Slotting optimization refers to the strategic arrangement of items within a physical space (such as a warehouse or distribution center) to maximize efficiency and reduce the time it takes to fulfill orders. Effective slotting optimization can produce significant benefits because, in a warehouse, retrieval of goods often consumes more than 50% of the warehouse operating costs. The majority of that is "travel time"-time spent walking to locations to pick products. Manual slotting is not effective because it cannot adapt to changing supply and demand patterns. As a result, automated slotting techniques are required in order to produce significant gains in slotting efficiency.

Slotting optimization involves analyzing various factors, such as product demand, order frequency, and storage capacity to determine the most efficient placement of items. For example, a distribution center may use slotting optimization to position frequently-ordered items near the shipping area, making them easily accessible and minimizing the time it takes to pick and pack these items. In contrast, less frequently-ordered items may be stored further away to make better use of available space and prevent congestion in high-demand areas.

By utilizing slotting optimization techniques, businesses can significantly improve their order fulfillment processes. This can lead to faster processing times, reduced labor costs, and ultimately, improved customer satisfaction. For instance, an e-commerce retailer that optimizes its warehouse slots may be able to ship orders faster, resulting in shorter delivery times and happier customers. Furthermore, slotting optimization can also help minimize errors and improve inventory management. By organizing items in a logical and efficient manner, warehouse staff can easily locate products, reducing the likelihood of picking errors and ensuring accurate order fulfillment.

Implementing slotting optimization effectively, however, poses many technological and organizational challenges, such as the following:

Constantly changing inventory: Warehouse slotting optimization requires regular updates to accommodate changes in inventory. New products, seasonal items, and discontinued stock can all impact the optimal slotting configuration.

Space constraints: Limited warehouse space can pose a challenge when implementing slotting optimization. Finding the right balance between maximizing storage capacity and minimizing travel distances can be complex.

Product characteristics: Different products have varying storage requirements, such as temperature control, fragility, or hazardous materials. Incorporating these considerations into slotting optimization adds another layer of complexity.

Data Management: Slotting optimization relies heavily on data, including historical sales data, product attributes, and customer preferences. Managing and analyzing large volumes of data can be a technological challenge, requiring robust data storage and processing capabilities.

Scalability: As warehouses grow and evolve, implementing slotting optimization becomes more challenging. The technology must be scalable to handle increasing inventory levels, changing product assortments, and fluctuating order volumes while maintaining optimal slotting strategies.

More generally, slotting optimization involves the use of complex algorithms to determine the most efficient placement of items in a warehouse. These algorithms must consider factors such as item popularity, size, weight, and compatibility, making it a technologically challenging task. The direct mathematical formulation of the slotting optimization problem is NP-hard, and hence is unsolvable in polynomial time for large inputs. Even a simplified version, in which there is only one reserve and one forward area, is an NP-hard combinatorial problem. As a result, practical automated slotting optimization techniques must be able to produce gains in slotting effectiveness in the face of such computational complexity.

What is needed, therefore, are improved techniques for automated slotting optimization.

SUMMARY

A computer-automated system performs slotting optimization based on inputs such as any one or more of the following: sales history, Advanced Shipment Notices (ASNs), picking history, current inventory, pick history, demand forecast, location placement, and multiple warehouse configuration parameters (e.g., slotting rules configurable by the user). Based on those inputs, the system detects product affinities, builds a predictive order book, and accounts for re-slotting costs and runs through multiple simulations to generate a slotting plan. The system receives feedback on its outputs and learns based on that feedback, thereby continuously improving the slotting recommendations that it generates.

Other features and advantages of various aspects and embodiments of the present invention will become apparent from the following description and from the claims.

DETAILED DESCRIPTION

A computer-automated system performs slotting optimization based on inputs such as any one or more of the following: sales history, Advanced Shipment Notices (ASNs), picking history, current inventory, pick history, demand forecast, location placement, and multiple warehouse configuration parameters (e.g., slotting rules configurable by the user). Based on those inputs, the system detects product affinities, builds a predictive order book, and accounts for re-slotting costs and runs through multiple simulations to generate a slotting plan. The system receives feedback on its outputs and learns based on that feedback, thereby continuously improving the slotting recommendations that it generates.

Figure 1:
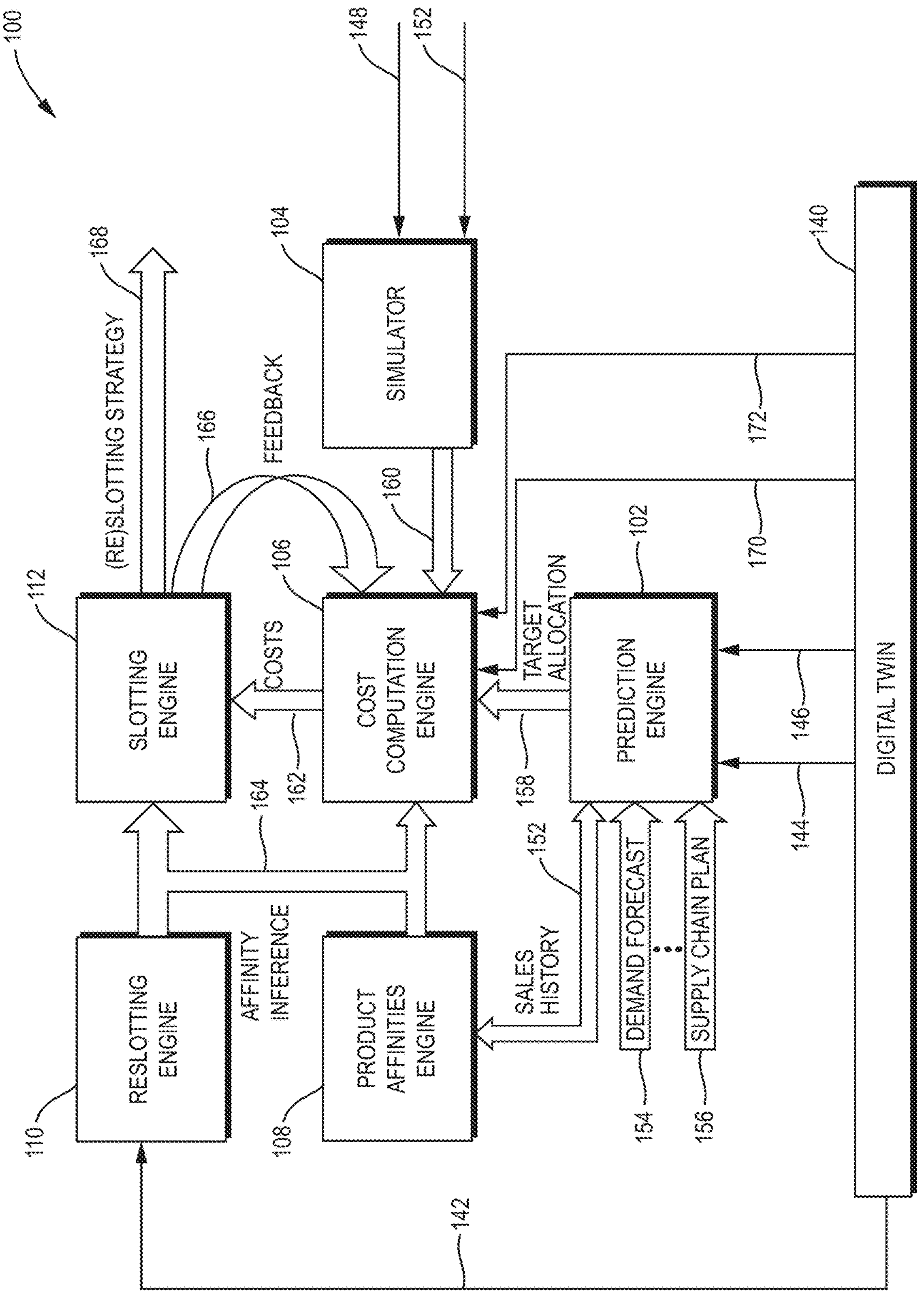
FIG. 1 is a diagram of a computer-automated slotting system implemented according to one embodiment of the present invention.

Referring to FIG. 1, a diagram is shown of a computer-automated slotting system 100 implemented according to one embodiment of the present invention. The system 100 may be used to assist with slotting in any kind of physical space, such as a warehouse or other facility. As a result, any reference herein to a particular kind of facility, such as a warehouse, should be understood to be applicable more generally to any kind of facility or other physical space.

Figure 2:
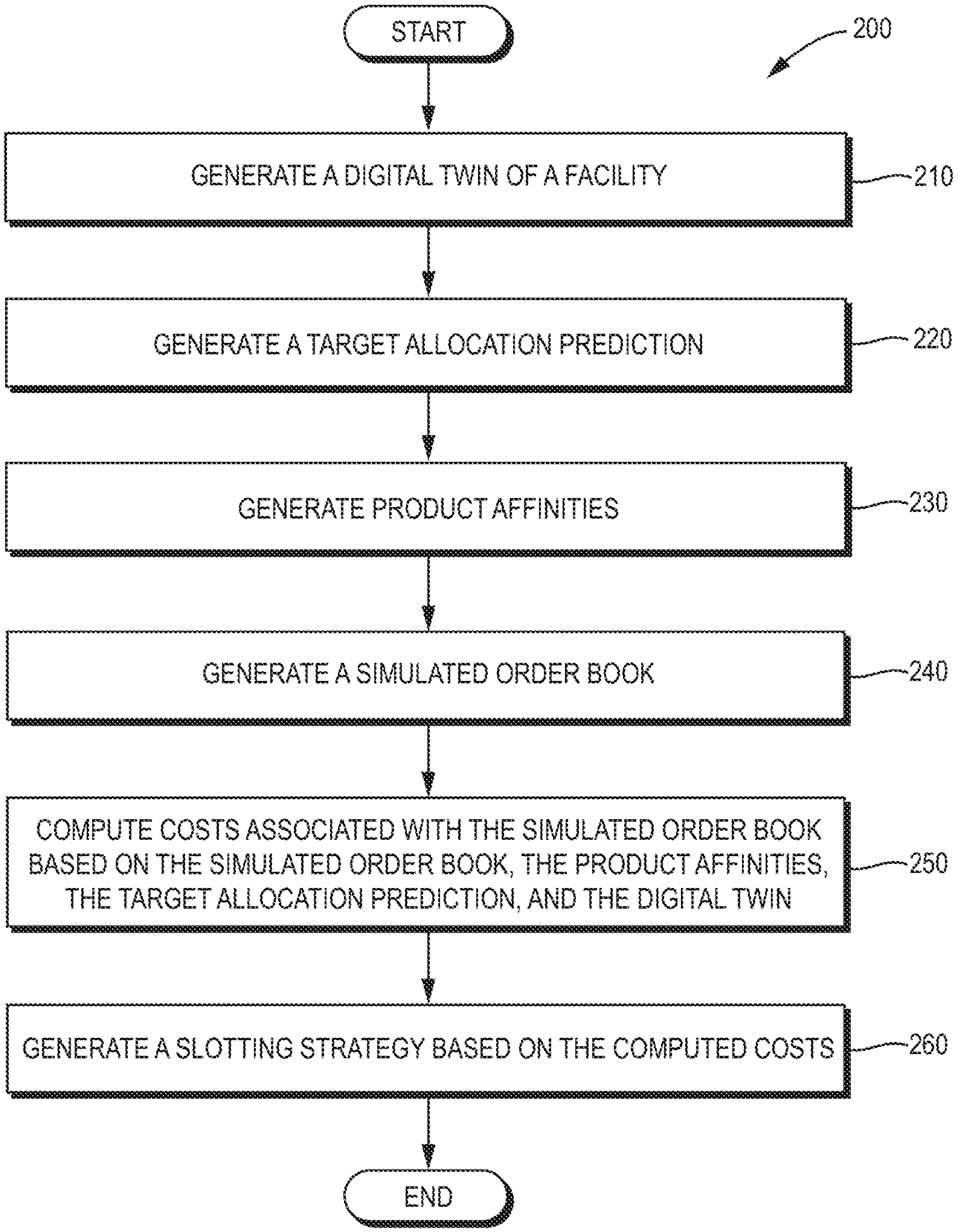
FIG. 2 is a flowchart of a method performed by the system of FIG. 1 according to one embodiment of the present invention.

The system 100 includes a predictive engine 102, which generates a target allocation 158 (FIG. 2, operation 220). The predictive engine 102 may, for example, receive any one or more of the following as inputs, and generate the target allocation 158 based on such inputs: sales history data 152, demand forecast data 154, a supply chain plan 156, one or more Advanced Shipping Notices (ASNs) 144, and one or more inventory entries 146. The demand forecast data 154 and supply chain plan 156 may be received, for example, from an Enterprise Resource Planning (ERP) system. The demand forecast data 154 may, for example, be an output of a demand planning engine, which is used to forecast aggregate demand by time period (e.g., quarter or year) based on pastilles, promotions being run, etc. The supply chain plan 156 may, for example, represent a plan for fulfilling the demand represented by the demand forecast data 154, such as by using internal manufacturing capabilities or by buying from outside vendors. The ASNs 144 may be used to solidify supply chain plan inputs, as these are actual scheduled inbound materials. The inventory entries 146 may, for example, be used for FIFO calculations.

The target allocation 158 may include data representing a prediction of an optimal SKU_UoM allocation. (In the context of warehouse slotting, "SKU" refers to Stock Keeping Unit, and "UoM" refers to Unit of Measure. A "SKU_UoM" is a particular SKU:UoM combination. A "SKU_UoM" allocation is an allocation of SKU_UoMs.) The target allocation 158 may, for example, be a vector having the same dimensionality m as the total number of SKU_UoMs, where m is the number of SKU_UoMs that are to be allocated inside the warehouse or other facility:

$$Q=[Q1,Q2, \ldots ,Qm]$$

In this vector, Qi is the quantity of the ith SKU_UoM that is to be allocated inside the warehouse.

The various types of data described above, may for example, include the following:

- Sales history data 152: any one or more of order ID, transaction date, item ID, SKU_UoM, and transaction quantity for each sale.
- Demand forecast data 154: any one or more of item ID, SKU_UoM, period of demand, and quantity of demand predicted for each item.
- Supply chain plan 156: any one or more of item ID, SKU_UoM, quantity of item, and relevant date(s) (e.g., manufacturing completion date, promised date) for each item.
- Advanced shipping notices (ASNs): any one or more of order ID, item ID, SKU_UoM, SKU_UoM quantity, ASN expected date, actual shipment date, and actual receipt date for each item.
- Inventory entries: any one or more of item ID, SKU_UoM, item quantity, and date of entry (e.g., receipt date, manufacturing completion date) for each receipt of inventory at the warehouse.

An ASN is a notification sent (often electronically) to a customer or consignee in advance of a shipment's arrival. It provides details about the shipment, such as the quantity, type of products, expected arrival time, carrier information, and more.

The ASN can facilitate smoother receiving processes at the warehouse or distribution center by allowing the recipient to prepare for the shipment's arrival. It helps in planning the labor and space required for unloading, inspecting, and storing the incoming goods, and it can also be used to cross-reference the delivered items with the purchase order to ensure accuracy. Overall, the ASN is an essential tool in modern supply chain management, enhancing communication and efficiency between trading partners.

The system 100 (e.g., the cost computation engine 106 described below) may use one or more order books as input. Such order books may be actual or predicted (simulated) order books. It may be useful to use simulated order books if the actual order books to be fulfilled are not known. The system 100 may include a simulator 104, which may, for example, receive sales data (such as an actual order book 148 and/or the sales history data 152) as input and generate, based on that input, a simulated order book 160 (FIG. 2, operation 240). The order book 160 may, for example, include data representing predictions of the average number and type of orders that will have to be fulfilled on a day to day basis. The simulator 104 may be executed any number of times to generate any number of simulated order books. The system 100 may minimize the average cost of fulfillment across a plurality of order books generated by the simulator 104. Note that although the following description refers to the use of the order book 160 output by the simulator 104, any function that is described herein as being performed using the order book 160 may instead be performed using an actual (non-simulated) order book.

The sales history data 152 may include, for example, for each of a plurality of sales, any one or more of the following: a transaction date of the sale, an item ID of the item sold in the sale, a SKU_UoM of the item sold in the sale, a quantity of the item sold in the sale, and an Order ID of the sale. The simulator 104 may, for example, understand the underlying pseudorandomness of sales data (e.g., the order book 148 and/or sales history data 152) within a particular period of time (e.g., one year) and generate the order book 160 based on that sales data. The order book 160 may, for example, include any one or more of the following: the number of orders, the number of distinct items in each order, the type(s) of items (e.g., item IDs) in each order, and the quantities of each distinct item in each order.

For example, the simulator 104 may use a sophisticated statistical approach to analyze the uncertainty and randomness in the sales history data 152. By understanding how that uncertainty is distributed across different aspects of the orders and applying principles from probability theory, the simulator 104 can create the order book 160 to reflect likely future orders in the warehouse. In particular, the simulator 104 may use a distributed entropy-based bootstrapping sampler which separates the potential sources of (conditional) uncertainty in a sequential manner. This sampler may work across different parts or sources of information and take into account various factors, such as product types, affinities, and seasonality. The sampler may take into account entropy in the sales history data 152, e.g., how uncertain or random different aspects of the sales history data 152 are. The bootstrapping aspect of the sampler may draw repeated samples from the sales history data 152 to make inferences from that data. The sampler may analyze the uncertainty related to different aspects of the orders in the sales history data 152 (e.g., product demand, order size) one by one, in a specific sequence. By doing so, it can consider how uncertainty in one area might affect or be affected by uncertainty in another.

The simulator 104 may extend the (conditional) chain rule of probability to distribute the entropy of randomness and use that to create the order book 160. As is well-known, the conditional chain rule allows for the calculation of joint probabilities by breaking them down into a series of conditional probabilities. The simulator 104 may apply the conditional chain rule to distribute the uncertainty across different aspects of the simulated orders in the order book 160. The simulator 104 may apply the statistical principles described above to understand the randomness inherent in the sales history data 152 and use that understanding to generate realistic data in the order book 160.

The system 100 also includes a cost computation engine 106. The cost computation engine 106 may, for example, receive any one or more of the following as inputs: the target allocation 158, an order book (e.g., an actual order book or the simulated order book 160 output by the simulator 104), an affinity inference 164, the architecture of the warehouse, the warehouse picking policy, the warehouse batching policy, and any feedback 166. The cost computation engine 106 may generate costs 162 as output, based on such inputs (FIG. 2, operation 250). The warehouse architecture that the cost computation engine 106 receives as input may, for example, be an actual architecture of the warehouse or the digital twin 140 of the warehouse described elsewhere herein. The costs 162 may, for example, include the total fulfillment cost of an order book (e.g., the order book 160 output by the simulator 104). The cost computation engine 106 may, for example, include two components: a computation component and an estimation component.

The cost computation engine 106 may, for example, receive any one or more of the following as inputs:

- A digital map 172 of the warehouse, which may contain, for example, labeled XY coordinates of the entire warehouse (from the top view) and locations of slot IDs on the above coordinates, including the types of slots.
- UoM conversion (i.e., the quantity of a SKU in a particular UoM).
- Scales of horizontal and vertical movements, and the relative ratio between costs of horizontal movement and costs of vertical movement for a given unit distance.
- Various policies and parameters 170 associated with the warehouse, such as the picking policy of the Warehouse Management System (WMS), the batching policy of the WMS, any slotting parameters, any resource allocation/limitation of the warehouse (e.g., SKU/zone restrictions), any algorithms that govern the batching of order books, and equipment information.

The cost computation engine 106 may minimize the cost to fulfill daily orders based on the current structure of the warehouse in any of a variety of ways. This cost may be computed based on the overall fulfillment and replenishment costs of the warehouse. The cost computation engine 106 may perform bilevel optimization to perform such cost minimization. Bilevel optimization in this context means that the cost computation engine 106 operates at two distinct hierarchical levels. At the upper level, strategic decisions are made concerning the overall management of warehouse resources, such as determining optimal inventory levels and setting broad slotting strategies. These decisions aim to minimize long-term operational costs and enhance the efficiency of the warehouse. At the lower level, the cost computation engine 106 focuses on operational decisions that directly impact daily activities, such as the specific allocation of tasks for order fulfillment and the scheduling of inventory replenishment. These decisions are made within the constraints and objectives set by the upper-level strategy, ensuring that daily operations align with the broader goals of the warehouse. Decisions at the lower level may provide feedback to the upper level, informing adjustments to strategies based on real-world outcomes and performance metrics. Conversely, the strategic framework established at the upper level may guide the optimization processes at the lower level, ensuring that daily operations contribute to the overarching objectives of cost minimization and operational efficiency.

By implementing bilevel optimization, the cost computation engine 106 effectively balances long-term planning with the agility needed for day-to-day operations, leading to a more cost-effective and responsive warehouse management system. This approach not only reduces the overall fulfillment and replenishment costs but also enhances the adaptability of the warehouse to changing demands and operational conditions.

Consider the following example in the context of a candy warehouse managing five specific SKUs—Skittles, Sour Patch Kids, Gummy Bears, M&Ms, and Nerds. At the upper level, the primary focus is on managing restock costs and prioritizing inventory replenishment based on demand patterns. For instance, if Skittles and Nerds experience higher demand compared to the other SKUs, the optimization model prioritizes their restocking. This strategic decision-making process involves analyzing sales data, forecasting demand, and calculating the cost implications of various restocking strategies. By prioritizing the replenishment of high-demand items, the warehouse can ensure a steady supply of these products, thereby minimizing potential sales losses due to stockouts and optimizing the use of financial resources allocated for inventory procurement.

Once the strategic decisions regarding restocking are set at the upper level, the lower level optimization takes over to handle the operational aspect of SKU distribution within the warehouse. The objective here is to arrange the units of each SKU in a manner that maximizes order fulfillment efficiency and minimizes handling costs. Given the high demand for Nerds and Skittles, the optimization model might place these items closer to the exit or in more accessible locations. This strategic placement reduces the travel time and effort required for picking these items, thereby speeding up the order fulfillment process and reducing labor costs.

The integration of upper and lower level optimizations forms a cohesive strategy that the cost computation engine 106 may use to address both the macro-level inventory management and micro-level operational efficiency. This bilevel approach allows the warehouse to dynamically adjust its strategies based on real-time data and changing market conditions. By aligning the restocking priorities with the most efficient distribution and storage strategies, the warehouse can significantly reduce the overall costs associated with inventory management and order fulfillment.

Embodiments of the present invention may use the following parameters and variables when performing bilevel optimization:

- N: Total number of sections in the warehouse.
- M: Total number of SKUs managed within the warehouse.
- x_ij: Binary variable indicating whether SKU i can be placed in section j.
- n_j: Number of slots available in section j.
- sl_j: Total slots in section j.
- cap_ij: Capacity of any slot in section j for SKU i.
- d_i: Expected demand for SKU i over the planning horizon.
- rsg_i: Restocking cost for SKU i.
- eq_i: Steady-state inventory level for SKU i.
- q_ij: Number of units of SKU i that fit in section j.

The upper-level optimization may focus on determining the optimal inventory levels (eq_i) for each SKU to minimize restocking costs, which are influenced by expected demand (d_i). The objective function at this level may calculate the total restocking costs by considering the proportion of products needed in the inventory and their associated restocking costs. This function is dependent on the outcomes of the lower-level optimization, forming a nested structure where the upper level sets the constraints and goals for the lower level.

Constraints that may be taken into account by the bilevel optimization process include:

The sum of products in each section equals the total number of products, ensuring that inventory levels are maintained across the warehouse.

The ratio of the number of SKUs per section to the capacity must not exceed the total number of slots available in each section.

The lower-level optimization aims to minimize the costs associated with arranging SKUs in the warehouse to efficiently fulfill orders. This involves calculating the expected cost of fulfilling an order, selected from a distribution of possible orders, given the SKU arrangement determined by the upper-level decisions. The goal is to find the most cost-effective arrangement of SKUs that facilitates quick and efficient order processing.

The combined optimization objective of the bilevel optimization process is to minimize the sum of the costs of fulfilling orders and the costs of restocking. This may be achieved by integrating the decisions from both levels, e.g.:

The lower level finds the minimum cost of fulfilling an order based on the SKU arrangement.

The upper level determines the optimal inventory levels to minimize restocking costs.

The overall system may strive to achieve the minimum combined cost, balancing order fulfillment efficiency with inventory management effectiveness. By implementing this bilevel optimization approach, embodiments of the present invention may dynamically adjust to changes in demand and operational conditions, ensuring optimal performance and cost efficiency.

The system 100 also includes a product affinities engine 108. Product affinity refers to the relationship between different products based on customer buying patterns and behavior. By analyzing historical sales data and transaction records (e.g., the sales history date 152), the product affinities engine 108 can identify patterns and correlations between products that are frequently purchased together or have a high likelihood of being purchased together, and generate an affinity inference 164 (FIG. 2, operation 230). The product affinities engine 108 may receive the sales history 152 and, based on that sales history 152, analyze and product affinities within the sales history 152, and generate the affinity inference 164 to quantify such product affinities. In particular, the affinity inference 164 may represent relationships between different items based on their co-occurrence and, in particular, frequency of co-occurrence in orders.

The product affinities engine 108 may generate the affinity inference 164 in any of a variety of ways. For example, the product affinities engine 108 may use a quasi-Bayesian approach, in which the product affinities engine 108 assumes that the entire order book consists of samples from a well-defined pseudo-random "order generator." The product affinities engine 108 may not assume that items in a particular order are independent of each other, but may instead try to mathematically quantify how items within the order book 160 are related to each other based on the order book 160. The resulting affinity inference 164 may, for example, include data representing cause-and-effect relationship within the affinities identified by the product affinities engine 108, such as the antecedent (cause), consequent (effect), confidence (a measure of how strong or reliable the identified relationship between products is), and average ratio.

The affinity inference 164 may represent the quantities above in the form of nodal graphs, where the nodes of the graphs contain the quantities and the edges of the graphs have the confidence values associated with the nodes connected by those edges. For example, if two nodes represent two products, an edge connecting those two nodes may contain a confidence value representing a confidence that the two products co-occur within an order. The average ratio may convey that for every quantity of antecedent, the consequent quantity is X times the antecedent quantity.

Consider, for example, a graph having a Node A representing the antecedent and a Node B representing the consequent. Assume that the Node A contains an order ID of the antecedent and that Node B contains an order ID of the consequent, and that there is a directed edge from Node A to Node B, having an associated confidence value. The direction of the edge from Node A to Node B corresponds to an affinity between the antecedent and the consequent only when the antecedent is brought into the warehouse. Also associated with Node A and Node B may be average ratio values obtained by finding the average ratios of antecedent-consequent pairs in the entire order book. For example, if the average ratio value associated with Node A is X and the average ratio value associated with Node B is Y, then every time a quantity of X of the antecedent is bought, then a quantity of Y of the consequent is bought in the same order, on average. As a particular example, if X=1 and Y=1.25, then on average, whenever 1 of the antecedent is bought, then 1.25 of the consequent is bought.

The system 100 also includes a reslotting engine 110, which receives the current inventory 142 of the warehouse and the costs 162 as input, and which generates reslotting strategies (i.e., strategies for rearranging items within slots in the warehouse) in order to reduce costs related to storing and retrieving items by placing them in more optimal locations within the warehouse. The goal of the reslotting engine 110 is to generate reslotting strategies that are profitable even when taking into account the added costs that would be incurred by implementing such reslotting strategies. A reslotting strategy 168 may, for example, be generated by the reslotting engine 110 and contain data representing a list of current and suggested optimal locations in which to slot items in the warehouse.

The system 100 also includes a slotting engine 112, which receives as input the costs 162, the affinity inference 164, and the output of the reslotting engine 110 and generates, based on those inputs, the slotting strategy 168 (FIG. 2, operation 260). The slotting strategy 168 may, for example, contain data representing a slot-wise allocation of SKU_UoMs and quantities. The slotting engine 112 may also generate the feedback 166 to the cost computation engine 106.

The reslotting engine 110 and/or slotting engine 112 may, for example, receive any one or more of the following inputs for each of a plurality of items to be slotted, the item ID, item dimensions (e.g., length, width, and/or height), and the item UoM;

labelled XY coordinates of the entire warehouse (from the top view);

aisle/slot locations based on the above coordinates;

types of slots available at the warehouse;

- for each type of slot, one or more dimensions of the slot (e.g., any one or more of slot length, slot height, and slot width)
- slot locations in the warehouse and their respective slot type;
- one or more picking and batching policies of the WMS;
- current inventory of items in the warehouse, e.g., for each item UoM, the item ID, slot ID, and quantity of the item.

The reslotting engine 110 and/or slotting engine 112 may generate the reslotting strategy and the slotting strategy 168 in any of a variety of ways. For example, for any given order book, the reslotting engine 110 and slotting engine 112 may work with a superset S of all possible configurations, with the goal of discovering the configuration having the lowest cost in the set S. (A configuration is a specific arrangement or layout of items within the warehouse that is associated with a particular set of cost.) However, the order book is not fully known. As a result, the reslotting engine 110 and/or slotting engine 112 may perform processing on expected costs of order books, rather than on deterministic (e.g., actual) costs of order books. This may be done, for example, by using the simulator 104 to generate multiple predictions/simulations of the order book for the upcoming fulfillment cycle, and attempting to find a configuration that minimizes the aggregated costs over all of these order books In this optimization process, occupancy/sparsity and the list of order books (over which we are trying to minimize costs) may together act as a fulfillment constraint.

The cardinality of the set S may be reduced by imposing an upper bound on it, thereby making it sparse. However, the reduced set would still be beyond exponential in terms of number of slots and items. As a result, even this reduction in cardinality does not reduce the computational complexity of the problem.

As described above, the predictive engine 102 may generate the target allocation 158, and the simulator 104 may perform simulations to generate the order book 160. These may be particularly useful if the order book to be fulfilled is not known (or is not fully known). However, if the order book to be fulfilled is fully known in advance, then embodiments of the present invention may generate the slotting strategy 168 without the predictive engine 102 and the simulator 104, and without generating the target allocation 158 and the order book 160.

For example, the system 100 may perform a method which analyzes the order book to be fulfilled over a specific period of time, without using the predictive engine 102 or the simulator 104. Such a method may perform item-wise summation of the order book over a windowed function of item, i.e., generate a sum, for each SKU in the order book, the quantity of that SKU that have been ordered. Such a sum may be calculated during a particular time period, such as over the past week, month, or year. This method identifies the total demand for each item (SKU) at the level of the warehouse within the particular window of time.

Embodiments of the present invention may create, store, and update a virtual representation, or "digital twin," of an existing warehouse (FIG. 2, operation 210). This digital twin 140 is a highly sophisticated tool that provides a detailed, three-dimensional representation and view of the warehouse, aiding in the precise and automated slotting of items. Embodiments of the present invention may receive information about an existing warehouse (e.g., one or more 3D models of the warehouse) and generate the digital twin 140 based on that information. The digital twin 140 may mirror the actual warehouse's layout and features, allowing for comprehensive visualization and analysis.

More specifically, embodiments of the present invention may use 3D modeling technology to engage in a rack design phase, which may include constructing virtual racks, aisles, rows, and zones in the digital twin. Input values, such as dimensions, materials, and specific requirements may be used to ensure that the digital twin 140 accurately reflects the physical warehouse's storage components. A specialized grid drawing system may be employed to meticulously build the floor of the digital warehouse. This includes the detailed layout of different zones, rows, racks, and aisles, mirroring the exact organization of the physical space of the actual warehouse.

Embodiments of the present invention may dynamically create the walls and ceiling within the digital twin. These algorithms may consider the warehouse's actual size and shape, generating these components in a way that is true to the real-world structure. One of the innovative features of embodiments of the present invention is their ability to integrate pre-existing, or "already built," 3D models into the digital twin's representation of the warehouse space. For example, through a simple drag-and-drop functionality, users may place these models at various locations within the digital twin, enhancing the realism and functionality of the virtual environment. As another example, embodiments of the present invention may automatically place already-built 3D models into the digital twin's representation of the warehouse. Embodiments of the present invention may provide tools that allow users to modify one or more parameters of an already-built 3D model. For example, users may use such tools to adjust the size of a storage rack or the position of partitions within a model By creating this detailed digital twin, embodiments of the present invention facilitate automated slotting processes within the warehouse in any of the ways disclosed herein. The digital twin 140 may not be a static entity; embodiments of the present invention may continue to store and update the digital twin 140 to reflect any changes within the actual physical warehouse. Examples of changes that embodiments of the present invention may use to trigger corresponding changes in the digital twin 140 include one or more of the following:

- Inventory Changes: Any changes in inventory levels, such as new stock arrivals, stock depletion, or adjustments due to audits, may trigger an update in the digital twin 140 to reflect current inventory status accurately. As another example, movements of items within the warehouse, whether temporary or permanent, may be mirrored in the digital twin 140 to maintain an accurate layout of physical stock locations.
- Operational Modifications: Updates to operational processes or workflows, such as changes in picking strategies or the introduction of new packing methods, may be reflected in the digital twin 140 to simulate and analyze the impact of these changes on warehouse operations. Integration of new technologies or upgrades to existing systems, such as automated guided vehicles (AGVs) or conveyor belt systems, may be incorporated into the digital twin 140 to assess their operational efficacy and spatial requirements.
- Physical Layout Adjustments: Any structural changes to the warehouse, such as the addition or removal of walls, expansion of storage areas, or reconfiguration of aisles, may be updated in the digital twin 140 to ensure it accurately represents the physical space. Modifications made to enhance safety, such as changes in emergency exit routes or updates to comply with new health and safety regulations, may be promptly reflected in the digital twin 140.

Resource Allocation: Changes in the allocation or deployment of resources, including machinery, labor, and storage equipment, may be updated in the digital twin 140 to optimize resource planning and utilization. Scheduled maintenance or unexpected downtime of equipment may be updated in the digital twin 140 to facilitate real-time planning and adjustments to warehouse operations.

In response to any of these changes, embodiments of the present invention may update the digital twin 140 automatically to enable it to remain current, thereby providing a continually accurate and valuable tool for warehouse management.

Furthermore, embodiments of the present invention enable users to quickly and easily build the digital twin 140 of the warehouse without prior knowledge of the underlying technology by enabling such digital twins to be constructed using a user-friendly drag-and-drop user interface that enables digital twins to be constructed from cuboids. Users may easily create racks of specific sizes and types, and can replicate those racks throughout an entire row.

Embodiments of the present invention may include a powerful search functionality that connects directly with the inventory backend information (i.e., information about the current inventory of the warehouse, such as the IDs and locations of items in the warehouse) in the digital twin 140. This allows users to easily locate specific items or materials within the digital twin 140 of the warehouse. By querying the detailed inventory data, users can find information about the exact location, quantity, and characteristics of items in real time, making it easier to plan and manage storage and retrieval operations.

Embodiments of the present invention offer the capability to modify the appearance of the 3D models within the digital twin 140 by altering the shader (a module that dictates how surfaces of objects within the digital twin 140 are rendered). Such modifications may include, for example, outlining versions of the materials, which may be used to highlight specific items or areas within the virtual warehouse. For example, high-priority goods or items that require special handling might be visually emphasized using this feature.

Embodiments of the present invention may maintain an open connection (socket) to listen for changes that occur on one or more associated web platforms, such as one or more Internet of Things (IoT) and/or RFID devices that can be associated with a product, equipment, or a person to track movement in real-time and reflect such movement in the digital twin 140. This may, for example, include updates from other systems, notifications from sensors, or input from users working on different devices. When any such change is detected, embodiments of the present invention may respond in real time, updating the digital twin 140 to reflect that change. This ensures that the digital twin 140 is always synchronized with the actual warehouse's current state and with other changes. For example, if an item's inventory level changes or a new shipment is recorded in a connected system, this information may be automatically reflected in the digital twin, thereby enabling accurate and up-to-the-minute slotting and other decision-making.

These additional functionalities further elevate the digital twin's value as a tool for modern warehouse management. The integration of inventory backend information provides direct insights into the status and location of goods within the digital environment. The ability to modify the appearance of 3D models enhances visual communication and understanding, and the real-time synchronization through an opened socket ensures that the digital twin 140 is constantly aligned with the actual conditions in the warehouse. Together, these features create a dynamic, interactive, and highly effective platform for managing and optimizing warehouse operations.

Embodiments of the present invention may use a 3D development platform, such as the Unity engine from Unity Technologies. Such a 3D development platform may be leveraged to enable developers to create complex and interactive 3D models of a warehouse for the digital twin. For example, Unity offers various functionalities, including physics engines, rendering capabilities, and a wide range of built-in components that can be used to model real-world behavior within the virtual environment. Embodiments of the present invention may use Object Oriented Programming (OOP) methodology to obtain the fullest potential of the 3D development platform's component workflow.

To ensure seamless communication with the backend services, embodiments of the present invention may implement an Application Program Interface (API), such as a REST (Representational State Transfer) API. This API acts as a bridge, enabling the exchange of information between the digital twin 140 and other backend systems, such as the inventory management system. The use of a REST API ensures standardized communication and allows for the real-time updating of information, such as inventory levels, product details, and warehouse configurations.

Embodiments of the present invention may include a user interface element, also referred to herein as an "information panel," which displays pertinent data about the warehouse's status, inventory, and operations. The backend services feed this information to the information panel, thereby keeping users informed about and engaged with the digital twin.

Embodiments of the present invention may use a pathfinding algorithm, such as the A* (A star) pathfinding algorithm, which is a popular and widely-used algorithm in computer science for finding the shortest path between nodes in a graph. It has applications in various domains, including video games, robotics, and network routing. Examples of other pathfinding algorithms including Dijkstra's Algorithm, the Bellman-Ford Algorithm, Greedy Best-First Search, and Jump Point Search. Embodiments of the present invention may use any pathfinding algorithm to calculate the most efficient paths for moving items within the warehouse, considering various factors like distances, coordinates, and time consumed. In the context of slotting plan functionality, a pathfinding algorithm (such as the A* algorithm) may be used to aid in determining optimal storage locations for items, taking into account the warehouse layout, item characteristics, and other constraints. This ensures that the slotting plan is both efficient and effective. By optimizing the distances and routes, embodiments of the present invention may help to minimize the time and effort required for various warehousing activities, such as picking, placing, and replenishing items.

In summary, embodiments of the present invention may integrate cutting-edge programming methodologies, interactive design features, and intelligent algorithms to create a sophisticated and dynamic digital twin 140 of the warehouse. By harnessing the power of Object-Oriented Programming, Unity's capabilities, REST API communication, and A* pathfinding, embodiments of the present invention may offer a comprehensive and versatile tool for modern warehouse management, enhancing visualization, decision-making, and overall efficiency.

The reslotting engine 110 and slotting engine 112 may generate the slotting strategy 168 in any of a variety of ways. For ease of explanation, the following description will refer to the slotting engine 112 as generating the slotting strategy 168, although in practice the slotting strategy 168 may be generated by the reslotting engine 110 and/or the slotting engine 112.

The slotting engine 112 may model the warehouse (using the digital twin) as a union of cuboids, and may treat each floor in the warehouse as a 2D array containing a plurality of shelves. A "section" of the digital twin 140 is a collection of slots. The digital twin 140 may include a plurality of sections. Within each section, all of the slots are standardized (e.g., all of the slots have the same dimensions, such as length, width, and/or height). Slots in different sections, however, may have different dimensions. The plurality of sections do not intersect, and the union of the plurality of sections equals the entire warehouse, as modeled by the digital twin.

Embodiments of the present invention may allow the digital twin 140 of the warehouse to include one or more "bulk locations," where a bulk location is defined as an area in the warehouse that is assumed to be able to accommodate all types of slots.

Embodiments of the present invention may measure the cost of traveling ("travel cost") from one slot to another based on the distance between those slots, measured in the manner just described. More generally, embodiments of the present invention may use costs as a proxy for distance. As a result, cost minimization may imply minimization of a summation of the relevant distances. Examples of types of costs that the cost computation engine 106 may calculate and use as proxies for distance include:

- Picking Costs: The costs associated with the process of retrieving ("picking") items from their storage locations in the warehouse to fulfill orders. This is a critical aspect of warehouse operations, especially in facilities that handle a high volume of orders. Picking costs may include for example, labor costs, equipment costs, error costs, energy costs, and/or impact of picking on other operations. Embodiments of the present invention can work with varying picking costs across slots. This would also make the algorithm applicable to "Golden Areas" which may have lesser picking costs in the warehouse compared to other slots.
- Travel Costs: The costs associated with traveling from one location to another within the warehouse.
- Dropping Costs: Time necessary to drop off items at a destination locator—e.g., offloading items from fork lift/pallet jack and physically placing them in the rack.
- Replenishment Costs: The costs associated with replenishing a particular SKU_UoM into a slot in the warehouse. Each SKU_UoM may have an associated replenishment cost. Different SKU_UoMs may have different associated replenishment costs.

The cost computation engine 106 may calculate any of the costs described above and include the resulting calculated costs in the costs 162. Any of a variety of changes associated with the warehouse may cause the costs 162 calculated by the cost computation engine 106 to change. For example, if the technology of the warehouse changes or expands (e.g., a new escalator or new intra-floor conveyor is installed in the warehouse), then the cost computation engine 106 may update its calculations of the costs 162 to reflect such changes to the warehouse. As another example, if a new wall is constructed or removed in the warehouse, this may alter travel costs and/or dropping costs in the warehouse, and the cost computation engine 106 may update its calculations of the costs 162 to reflect such changes to the warehouse.

In the context of warehouse operations, an "order book" refers to a comprehensive record or ledger containing all the orders that a warehouse has received. These orders typically come from customers or other parts of the business and represent requests for specific goods to be shipped or delivered. Examples of the contents of an order book include the following:

- Order Details: This includes information about each order, such as the products requested, quantities, order date, requested delivery date, customer details, shipping address, and any special instructions.
- Status Tracking: The order book may also track the status of each order as it moves through various stages of processing, picking, packing, shipping, and delivery. This helps in coordinating different parts of the warehouse operation and provides visibility into the status of outstanding orders.
- Priority Handling: Orders might be prioritized in the order book based on factors like delivery deadlines, customer importance, or the nature of the goods. This can guide the order in which items are picked and shipped.
- Integration with Other Systems: The order book may be part of a larger Warehouse Management System (WMS) or Enterprise Resource Planning (ERP) system, allowing it to integrate with other aspects of the business, such as inventory management, shipping, and billing.

An order book may be divided into batches. Such grouping into batches may be based, for example, on factors such as order priority, delivery location, and product type. Each batch represents a collection of orders that will be handled together. Such batches may, for example, be of equal size. The batches may, for example, be fulfilled sequentially across batches.

A warehouse "batching policy" is the method or strategy used to group orders into batches for more efficient processing within the warehouse. This is a part of the warehouse's overall order fulfillment strategy, which aims to optimize the picking, packing, and shipping processes. Batching policies can vary based on the specific needs and priorities of the warehouse, but they generally focus on grouping orders in a way that maximizes efficiency and minimizes costs, such based on order similarity, order priority, order size, equipment and labor utilization, shipping considerations, and a desire to align with the warehouse picking strategy. By implementing an effective batching policy, a warehouse can significantly improve the efficiency and accuracy of its operations, reducing costs and enhancing customer satisfaction.

"Processing" a batch involves dividing the fulfilled batch across different shelves, sections, or aisles and allocating specific tasks to the picking staff. This is a more detailed step that organizes how the fulfilled orders will be handled within the warehouse. It may involve things like sorting the items for final packaging, labeling, or assigning specific orders to specific workers or teams.

After a batch is processed, it is "fulfilled," which means that the items for all the orders within that batch have been collected, packed, and are ready for shipment. Fulfillment is the overall process of getting the ordered items from their storage locations and preparing them for delivery to the customers. It includes everything from picking the items off the shelves to packing them in shipping boxes.

A warehouse may have a picking policy. A picking policy is a set of rules or strategies that govern how items are selected and retrieved from their storage locations in the warehouse. Different policies may prioritize efficiency, accuracy, speed, or other factors. Common picking policies might include wave picking, zone picking, or batch picking. A picking policy may, for example, follow a First In First Out (FIFO) strategy, with the assumption that the SKU_UoMs that are slotted first are fulfilled first if they are available at more than one location in the warehouse.

Each batch may be further divided based on the aisles where the items are located into "aisle orders." Such division may be performed in accordance with the warehouse's picking policy (such as the FIFO strategy). The information about which items to pick from each aisle is made available to the relevant personnel or systems for every batch. This helps to coordinate the picking process across different parts of the warehouse.

A "stage" is a designated area where picked items are gathered, organized, and prepared for the next step in the fulfillment process, such as packing or shipping. Bringing items to the stage is part of the process of getting them ready to leave the warehouse. The picking policy deployed by the warehouse determines the way in which specific products (SKU_UoMs) in the required quantities are collected and prepared (brought to the stage) to fulfill the orders in each batch. Hence, the total cost of fulfillment operations is a function of the order book, the warehouse picking policy, the warehouse batching policy, and the warehouse structure.

Each warehouse typically has a "main stage," which is a central area or hub within the warehouse where items are collected, processed, or staged after being picked from the aisles. The main stage is a designated space that acts as a connecting point or common area where items from different aisles are brought together for further processing, such as packing, sorting, or shipping.

As one example of an embodiment of the present invention, consider the following test case, in which every aisle in the warehouse has a designated area at the bottom, called the "aisle stage" for that aisle, which serves as a temporary holding or staging area for items that have been picked from that aisle. To get items from the slots (shelves) in the aisle to the aisle stage, vertical movement is used, meaning items are moved straight down to the aisle stage area. The aisle stage in each aisle can be accessed from the main stage (central area) of the warehouse using only horizontal movements. This separation of vertical and horizontal movements aids in efficient navigation and handling within the warehouse.

In this particular example, after receiving communication about what to pick from each aisle, the staff pick the required items and move them vertically downward to the aisle stage of that aisle, in readiness for further movement. Once all such vertical picking has been completed in the aisles, the warehouse staff transitions to the horizontal picking stage, in which all items held in the respective aisle stages of the aisles are moved solely horizontally to the main stage. This final step consolidates all picked items in the main stage (central area), where they can be further processed (e.g., packed and shipped). However, embodiments of the present invention are able to scale beyond the above-mentioned warehouse staging policy and picking policy.

The example process above represents a methodical and structured approach to picking that leverages the physical layout of the warehouse to maximize efficiency. By separating the picking process into vertical and horizontal stages and utilizing dedicated staging areas at the end of each aisle, the warehouse can streamline the movement and handling of items, potentially reducing the time and effort required to fulfill each order.

To accommodate the above-described warehouse geometric model, different types of costs, and various aspects of warehouse operations, embodiments of the present invention may use a modular slotting system of the kind shown in FIG. 1.

One of the advantageous features of embodiments of the present invention is their ability to continuously learn and improve based on user feedback. By receiving feedback on its outputs, the system is able to identify areas of improvement and refine its slotting recommendations. This adaptive learning process ensures that the system constantly enhances its performance, resulting in increasingly accurate and effective slotting plans.

In order to generate the most optimal slotting plan, embodiments of the present invention may run through multiple configurations and use such simulations to take into consideration various factors, such as re-slotting costs, warehouse parameters, and user-defined slotting rules when generating slotting recommendations. By evaluating different scenarios, the system is able to compare the efficiency of each plan, ultimately providing the most cost-effective and streamlined solution.

Embodiments of the present invention may be used to produce significant improvements in efficiency and cost reduction for warehouse operations. By maximizing product accessibility, minimizing travel distances, and optimizing storage capacity, the system may be used to ensure that inventory management becomes more streamlined and cost-effective.

Instead of relying on manual labor to determine the most efficient placement of inventory items within the warehouse, embodiments of the present invention may be used to automate the slotting process. By analyzing historical sales data, order patterns, and other relevant factors, embodiments of the present invention intelligently identify the optimal locations for each item in the warehouse.

For example, consider a retail company that offers a wide range of products, from small accessories to large appliances. Traditionally, warehouse employees would spend a significant amount of time manually organizing and reorganizing the inventory to ensure efficient storage and retrieval. This process not only required a substantial labor force but also led to errors and inefficiencies due to human limitations.

By using embodiments of the present invention, such a retail company may eliminate the need for manual slotting entirely by automatically calculating the optimal placement for each item based on sales data, product characteristics, and other relevant factors. This not only reduces labor costs associated with slotting but also minimizes the risk of errors and improves overall operational efficiency.

Furthermore, embodiments of the present invention provide flexibility and adaptability. As a business grows or changes its product mix, embodiments of the present invention may easily adjust the slotting strategy to accommodate new items or changes in demand patterns. This eliminates the need for costly and time-consuming physical reconfigurations of the warehouse layout.

A company that uses an embodiment of the present invention to perform slotting may significantly reduce upfront capital investments. A software-based solution that implements an embodiment of the present invention may leverage existing infrastructure and only require a computer system with sufficient processing power. This makes it accessible and affordable for businesses of all sizes, from small startups to large enterprises.

Embodiments of the present invention may generate a predictive order book: a forecast of the orders that will typically be fulfilled in a particular period of time. This ability provide a variety of benefits, such as:

- Improved Inventory Management: By forecasting the orders that will typically be fulfilled, the warehouse can manage inventory levels more efficiently. This ensures that there is enough stock to meet anticipated demand without overstocking, which would tie up capital and potentially lead to obsolescence.
- Enhanced Supply Chain Coordination: With a predictive view of future orders, coordination with suppliers can be optimized. This means timely reordering, negotiating better terms with suppliers, and aligning production schedules if manufacturing is involved.
- Better Resource Allocation: Knowing in advance what orders are likely to come in helps in planning the labor and equipment needed to process those orders. This can lead to more efficient scheduling and utilization of resources, reducing operational costs.
- Reduction in Stockouts and Overstocks: Accurate predictions help in maintaining the right balance of inventory, reducing the chances of stockouts (where an item is unavailable) or overstocks (where too much of an item is kept). This helps in maintaining customer satisfaction and reduces holding costs.
- Strategic Planning Support: Forecasting the order book can be a vital tool for long-term strategic planning. It can guide decisions on warehouse expansion, technology investments, partnerships with suppliers, and other strategic initiatives.
- Risk Mitigation: Predictive analytics can also identify potential risks in the supply chain, such as dependence on a single supplier for a critical item. By foreseeing potential challenges, steps can be taken to mitigate these risks before they become issues.
- Agility in Responding to Market Changes: With a clear understanding of future demand, a warehouse can be more agile in responding to market trends and changes. If a sudden surge or drop in demand is predicted, the warehouse can respond quickly to capitalize on opportunities or minimize losses.

Embodiments of the present invention may generate slotting recommendations which take reslotting costs into account, and which attempt to minimize such reslotting costs. This ability provides a variety of benefits, such as:

- Cost Efficiency: Reslotting can be an expensive and labor-intensive process. Minimizing these costs can lead to significant savings, allowing resources to be allocated elsewhere in the warehouse.
- Optimized Space Utilization: Proper slotting ensures that products are placed in the most efficient locations within the warehouse. This optimal use of space can increase the capacity of the warehouse and make material handling more efficient.
- Reduced Labor Costs: By minimizing the need for reslotting, the warehouse can reduce the labor costs associated with moving products from one location to another. This can also reduce the risk of worker fatigue and related injuries.
- Improved Picking Efficiency: Slotting that takes into account the frequency and co-occurrence of picks can reduce travel time for pickers. This leads to faster order fulfillment and can have a positive impact on customer satisfaction.
- Increased Agility and Responsiveness: By continually analyzing and adjusting slotting to minimize reslotting costs, the warehouse becomes more agile and can respond more quickly to changes in order patterns or inventory levels.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically analyze data (such as sales history data) to generate the simulated order book 160, and then generating the slotting strategy 168 automatically based on the order book 160, among other inputs. Embodiments of the present invention may also automatically update the order book 160 and the slotting strategy 168 in response to changes in the warehouse, such as changes in the inventory of the warehouse. Such functions cannot be performed mentally or manually and are inherently rooted in computer technology.

As an additional example, the predictive engine that generates target allocations based on inputs such as sales history, demand forecasts, and supply chain plans is inherently rooted in computer technology. This engine utilizes algorithms and data processing techniques that require substantial computational power and storage capabilities, which are beyond the scope of manual calculations or mental estimations.

Additionally, the digital twin of the warehouse represents a significant improvement to computer technology. This virtual model may be dynamically updated in real-time to mirror the physical state of the warehouse, incorporating changes in inventory, layout modifications, and operational adjustments. The digital twin enables simulations and optimizations that transform the planning and operational strategies within the warehouse, effectively turning data into actionable insights and operational enhancements. This transformation of abstract data into a detailed, interactive model that can predict outcomes and influence real-world operations is a clear example of a feature that changes an entity into a different state or thing.

These features collectively highlight how embodiments of the invention leverage computer technology to address complex problems in warehouse management, offering solutions that are not feasible without the use of advanced computing techniques. Each component, from the predictive engine and digital twin to the implementation of sophisticated pathfinding algorithms, not only relies on but also advances computer technology, offering technological solutions to technological problems.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method, performed by at least one computer processor executing computer program instructions stored on at least one non-transitory computer-readable medium, the method comprising:

generating a digital twin of a facility, wherein the digital twin comprises a three-dimensional model with labeled coordinates representing a warehouse layout, slot locations, and slot types, wherein generating the digital twin comprises constructing the three-dimensional model of the facility using input from at least one three-dimensional scanning device, wherein the generating further comprises capturing real-time data from the facility using sensors, the real-time data representing changes in a layout inventory level, and updating the digital twin in real-time based on changes detected in the facility based on the real-time data captured from the sensors;

generating a prediction of a target allocation of items in the facility based on the digital twin, sales history data, demand forecast data, and supply chain plan data;

generating product affinities based on the sales history data;

generating a simulated order book, wherein generating the simulated order book comprises using distributed entropy-based bootstrapping sampling that separates potential sources of conditional uncertainty in the sales history data in a sequential manner, and extends a conditional chain rule of probability to distribute entropy of randomness across different aspects of simulated orders in the simulated order book;

computing costs associated with the simulated order book based on the simulated order book, the product affinities, the prediction of the target allocation of items in the facility, and the digital twin, wherein computing costs comprises using a pathfinding algorithm to calculate paths for moving items within the facility, and wherein the digital twin is used to calculate travel distances based on horizontal and vertical movements between specific slot coordinates;

generating a slotting strategy based on the costs associated with the simulated order book, wherein generating the slotting strategy comprises performing bilevel optimization where upper-level decisions determine optimal inventory levels to minimize restocking costs and lower-level decisions determine SKU arrangement to minimize order fulfillment costs based on the digital twin's spatial representation, and rendering a modified three-dimensional model of the digital twin by outlining surfaces of objects in order to highlight specific items within the digital twin on a user interface.

2. The method of claim 1, wherein generating the prediction of the target allocation of items in the facility comprises:

analyzing patterns in sales history data, demand forecast data, and supply chain plan data to optimize item placement.

3. The method of claim 2, wherein generating the prediction of the target allocation of items further comprises:

simulating allocation scenarios using the digital twin to assess the impact of different allocation strategies on operational efficiency.

4. The method of claim 2, wherein generating the prediction of the target allocation of items further comprises:

performing cluster analysis to group items based on similar handling and storage characteristics, facilitating the creation of zones within the facility optimized for specific types of items.

5. The method of claim 1, wherein generating the slotting strategy comprises:

optimize the placement of items within the facility to minimize overall fulfillment costs.

6. The method of claim 5, wherein optimizing the placement of items within the facility comprises:

prioritizing item placement based on frequency of access and proximity to shipping areas to reduce travel and handling costs.

7. The method of claim 5, wherein optimizing the place of items within the facility comprises:

simulating different slotting configurations using the digital twin to compare cost implications of each configuration.

8. The method of claim 1, wherein generating the digital twin of the facility further comprises: applying machine learning to refine the digital twin based on discrepancies between predicted and actual facility operations.

9. The method of claim 1, wherein generating the prediction of the target allocation of items comprises:

optimizing placement of items to minimize average distance traveled for picking operations, considering constraints related to item size, weight, and storage requirements.

10. The method of claim 1, wherein generating the product affinities includes:

analyzing transaction records to identify frequently co-purchased items; and determining strengths of relationships between co-purchased items based on frequency and recency of purchases.

11. The method of claim 1, wherein generating the simulated order book includes:

using a simulator to generate predictions of customer orders based on historical sales data and current market trends.

12. The method of claim 1, wherein computing costs associated with the simulated order book includes:

calculating total fulfillment costs based on the simulated order book and the digital twin of the facility.

13. The method of claim 1, further comprising:

integrating real-time feedback from the facility's operational data to dynamically adjust the slotting strategy in response to changes in the operational data.

14. The method of claim 1, further comprising:

applying a machine learning model to predict the impact of the slotting strategy on future operational efficiency and cost savings.

15. The method of claim 1, wherein generating the slotting strategy comprises optimizing over a superset of possible configurations to discover a configuration having the lowest cost, wherein the optimization is performed on expected costs of a plurality of simulated order books rather than deterministic costs, and wherein occupancy and sparsity of the warehouse and the plurality of simulated order books together act as a fulfillment constraint.

16. A system comprising at least one non-transitory computer-readable medium having computer program instructions stored thereon, the computer program instructions being executable by at least one computer processor to perform a method, the method comprising:

generating a digital twin of a facility, wherein the digital twin comprises a three-dimensional model with labeled coordinates representing a warehouse layout, slot locations, and slot types, wherein generating the digital twin comprises constructing the three-dimensional model of the facility using input from at least one three-dimensional scanning device, wherein the generating further comprises capturing real-time data from the facility using sensors, the real-time data representing changes in a layout inventory level, and updating the digital twin in real-time based on changes detected in the facility based on the real-time data captured from the sensors;

generating a prediction of a target allocation of items in the facility based on the digital twin, sales history data, demand forecast data, and supply chain plan data;

generating product affinities based on the sales history data, wherein generating the simulated order book comprises using distributed entropy-based bootstrapping sampling that separates potential sources of conditional uncertainty in the sales history data in a sequential manner, and extends a conditional chain rule of probability to distribute entropy of randomness across different aspects of simulated orders in the simulated order book;

generating a simulated order book;

computing costs associated with the simulated order book based on the simulated order book, the product affinities, the prediction of the target allocation of items in the facility, and the digital twin, wherein computing costs comprises using a pathfinding algorithm to calculate paths for moving items within the facility, and wherein the digital twin is used to calculate travel distances based on horizontal and vertical movements between specific slot coordinates;

generating a slotting strategy based on the costs associated with the simulated order book, wherein generating the slotting strategy comprises performing bilevel optimization where upper-level decisions determine optimal inventory levels to minimize restocking costs and lower-level decisions determine SKU arrangement to minimize order fulfillment costs based on the digital twin's spatial representation, and rendering a modified three-dimensional model of the digital twin by outlining surfaces of objects in order to highlight specific items within the digital twin on a user interface.

17. The system of claim 16, wherein generating the digital twin of the facility further comprises: applying machine learning to refine the digital twin based on discrepancies between predicted and actual facility operations.

18. The system of claim 16, wherein generating the slotting strategy comprises optimizing over a superset of possible configurations to discover a configuration having the lowest cost, wherein the optimization is performed on expected costs of a plurality of simulated order books rather than deterministic costs, and wherein occupancy and sparsity of the warehouse and the plurality of simulated order books together act as a fulfillment constraint.

* * * * *